United States Patent [19]

Isaman et al.

[11] Patent Number: 4,549,292

[45] Date of Patent: Oct. 22, 1985

[54] METHOD OF EFFICIENTLY AND SIMULTANEOUSLY TRANSMITTING BOTH ISOCHRONOUS AND NONISOCHRONOUS DATA IN A COMPUTER NETWORK

[75] Inventors: David L. Isaman; Ronald S. Perloff, both of San Diego; Christopher J. Tomlinson, Encinitas, all of Calif.

[73] Assignee: Burroughs Corporation, Detroit, Mich.

[21] Appl. No.: 581,350

[22] Filed: Feb. 17, 1984

[51] Int. Cl.$^4$ .............................................. H04J 3/02
[52] U.S. Cl. .................................. 370/89; 340/825.05
[58] Field of Search ...................... 370/89, 86, 94, 95; 340/825.05, 825.5

[56] References Cited

U.S. PATENT DOCUMENTS

| | | | |
|---|---|---|---|
| 4,154,983 | 5/1979 | Pedersen | 370/89 |
| 4,251,880 | 2/1981 | Baugh et al. | 370/89 |
| 4,383,315 | 5/1983 | Torng | 370/89 |
| 4,445,116 | 4/1984 | Grow | 370/89 |
| 4,459,588 | 7/1984 | Grow | 370/89 |

*Primary Examiner*—Douglas W. Olms
*Attorney, Agent, or Firm*—Charles J. Fassbender; Kevin R. Peterson

[57] ABSTRACT

A method of transmitting isochronous and nonisochronous data through a computer network in which a plurality of stations have respective input and output ports that are serially coupled together to form a loop includes the steps of: transmitting data characters of a nonisochronous frame from a first station in the loop; passing the data characters from the first station through a second station in the loop but with a pair of control characters inserted between any two data characters indicating the beginning and end of an isochronous frame within the nonisochronous frame; passing the data characters and control characters from the second station through a third station on the loop but with another internally generated isochronous data character inserted between the control characters; temporarily stopping the transmitting step in the first station in response to the receipt of at least one of the control characters to pass the isochronous frame through the first station; and proceeding in the first station with the transmitting of the nonisochronous frame after passing the isochronous frame.

11 Claims, 4 Drawing Figures

FIG. 4.

| | S1 | S2 | S3 | RT | S4 | S5 | S6 |
|---|---|---|---|---|---|---|---|
| 1 | 100 | 99 | 98 | 97 | 96 | 95 | 94 |
| 2 | DT | 100 | 99 | 98 | 97 | 96 | 95 |
| 3 | T | DT | 100 | 99 | 98 | 97 | 96 |
| 4 | I | I | DT | 100 | 99 | 98 | 97 |
| 5 | I | DH | I | DT | 100 | 99 | 98 |
| 6 | I | 1 | DH | I | DT | 100 | 99 |
| 7 | I | 2 | 1 | DH | I | DT | 100 |
| 8 | I | 3 | 2 | 1 | DH | I | DT |
| 9 | I | 4 | 3 | 2 | 1 | DH | I |
| 10 | I | 5 | 4 | S | 2 | 1 | DH |
| 11 | DH | 6 | 5 | I1 | S | 2 | 1 |
| 12 | 1 | 7 | 6 | I2 | I1 | S | 2 |
| 13 | 2 | 8 | 7 | E | I2 | I1 | S |
| 14 | S | 9 | 8 | 3 | E | I2 | I1 |
| 15 | I1 | S | 9 | 4 | 3 | E | I2' |
| 16 | I2' | I1' | S | 5 | 4 | 3 | E |
| 17 | E | I2' | I1' | 6 | 5 | 4 | 3 |
| 18 | 3 | E | I2' | 7 | 6 | 5 | 4 |
| 19 | 4 | 10 | E | 8 | 7 | 6 | 5 |
| 20 | 5 | 11 | 10 | 9 | 8 | 7 | 6 |
| 21 | 6 | 12 | 11 | 10 | 9 | 8 | 7 |
| 22 | 7 | 13 | 12 | 11 | 10 | 9 | 8 |
| 23 | 8 | 14 | 13 | 12 | 11 | 10 | 9 |

4,549,292

METHOD OF EFFICIENTLY AND SIMULTANEOUSLY TRANSMITTING BOTH ISOCHRONOUS AND NONISOCHRONOUS DATA IN A COMPUTER NETWORK

BACKGROUND OF THE INVENTION

This invention relates to computer networks in which a plurality of stations have respective input and output ports that are serially coupled together in a loop; and more particularly, it relates to methods of operating the stations in the network such that both isochronous information (e.g., periodic voice samples) and nonisochronous data (blocks of characters in a computer data bank) are efficiently and simultaneously transferred between the stations.

In the past, various methods and protocols have been used to transmit messages from one station to another in a computer network of the type referred to above. However, a problem with transmitting both voice samples and data characters in a single network is that they have totally different bandwidth requirements, latency requirements, and integrity requirements.

Voice requires a small bandwidth over a long time duration. High quality voice can be transmitted in a bandwidth of only 64 kilobits per second; but the bandwidth must be available for the entire duration of a conversation. Typically, a telephone conversation lasts several minutes.

Data, on the other hand, requires a large bandwidth for a short time duration. For example, data that is read by a computer from a disk or RAM memory for transmission can be read at millions of bits per second. At that rate, an entire block of data can be transmitted in only a few seconds.

As to the latency requirement, voice samples must be generated and received at regular intervals. Any latency between source and destination must remain constant in order to avoid distortion of pitch and tone. Further, due to the characteristics of public carriers, it is necessary that voice destined to travel on such a public carrier reach that carrier with a latency of no more than one millisecond; otherwise, echo is introduced into the conversation.

Computer data, by comparison, can be delayed in a station before its transmission for several minutes. Also, the time delay between consecutive blocks of a multi-block transmission from a station can vary from one block to the next.

As to the integrity requirement, a voice sample can occasionally be delivered to a receiving station in a corrupted form; or it may not be delivered at all. Such an occasional error will not be detectable by a person that listens to the reconstructed voice at the receiving station. Thus there is no need to retransmit a voice sample that has been delivered in error.

On the other hand, dropping just a single bit in a block of computer data during its transmission from one station to another generally is intolerable. Consequently, each block of computer data generally has error check codes appended to it. Also, a response is generally sent by the station that receives a data block back to the transmitting station indicating the condition in which the data block was received.

Accordingly, a primary object of this invention is to provide a method of operating the stations in a computer network which enables both voice and data to be simultaneously transmitted between the stations of a computer network while satisfying all of the above-described conflicting requirements of bandwidth, latency, and integrity.

BRIEF SUMMARY OF THE INVENTION

A method of transmitting both isochronous and nonisochronous data through the stations of a computer network in accordance with the present invention includes the steps of:

transmitting data characters of a nonisochronous frame from a first station in said network;

passing the data characters from the first station through a second station in the network while inserting a pair of control characters between any two data characters indicating the beginning and end of an isochronous frame within the nonisochronous frame;

passing the data characters and control characters from the second station through a third station on the network while inserting another internally generated isochronous data character between the pair of control characters;

temporarily stopping the transmitting step in the first station in response to the receipt of at least one of the control characters to pass the isochronous frame through the first station; and proceeding, in the first station, with the transmitting of the nonisochronous frame after passing said isochronous frame.

BRIEF DESCRIPTION OF THE DRAWINGS

Various features and advantages of the invention are described in the Detailed Description in conjunction with the accompanying drawings wherein:

FIG. 4 illustrates the steps by which the stations of FIGS. 2 and 3 operate in the network of FIG. 1.

DETAILED DESCRIPTION OF THE INVENTION

Figure 1:
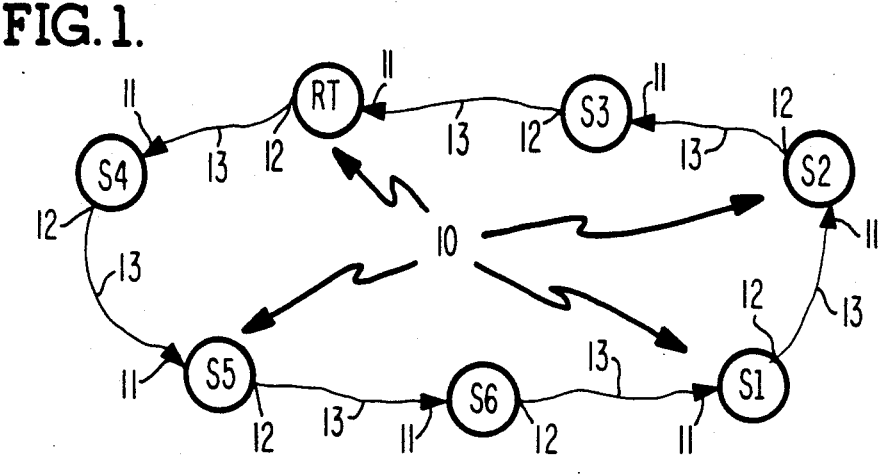
FIG. 1 illustrates a computer network in which the present invention is carried out.

Referring now to FIG 1, there is illustrated a computer network 10 which is comprised of a plurality of stations S1, S2, S3, RT, S4, S5, and S6. Each of the stations has an input port 11 and an output port 12; and they are serially coupled together via a coupling 13 to form a communication loop. Ports 11 and 12 may respectively receive and transmit signals in a bit serial fashion or in a parallel fashion. Also, coupling 13 may suitably be electrical or optical.

Figure 2:
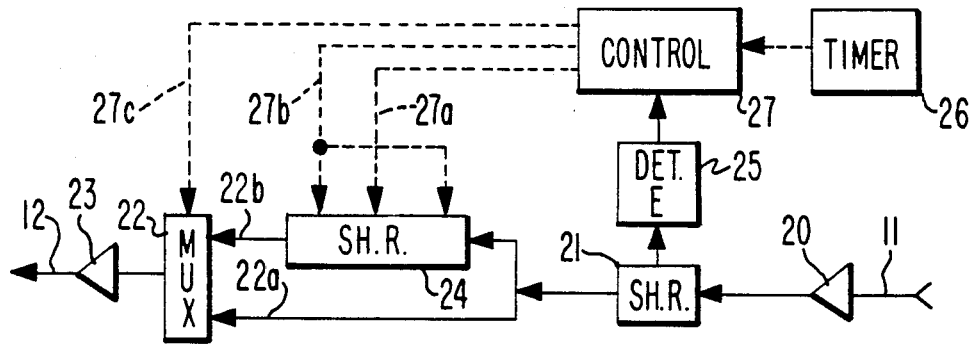
FIG. 2 shows the details of a station RT in FIG. 1.

A diagram of station RT is shown in FIG. 2. This station initiates transfers of "real time" isochronous data frames around the network 10; hence it is labeled with the letters RT. Isochronous frames from station RT occur at regular period time intervals; and they "interrupt" any other data transfers that may be occurring on network 10 at the same time. That is, isochronous frames from station RT temporarily stop and override any other data transfers that may be occurring on network 10.

In FIG. 2, input port 11 is a bit serial conductor which couples through a receiver 20 to a shift register 21. Shift register 21 has a serial output which couples to an input 22a of a multiplexer 22; and the output of multiplexer 22 is coupled through a transmitter 23 to output port 12. Thus, a data path is formed by components 11, 20, 21, 22a, 22, 23, and 12 which pass data from input port 11 to output port 12 of station RT with a delay which those components impose. In one specific embodiment, register 21 stores one character (8 bits), and thus imposes a delay of eight bit periods.

Shift register 21 also has its output coupled to the input of another shift register 24 which in turn has its output coupled to another input 22b of multiplexer 22. Thus, a second data path is formed through station RT by components 11, 20, 21, 24, 22b, 22, 23, and 12. This second data path has a delay which is longer than the previously described data path due to the presence of shift register 24. In one specific embodiment, register 24 stores four characters (32 bits), and thus imposes a delay of thirty-two bit periods.

Also included in station RT is a detection circuit 25, a timer circuit 26, and a control circuit 27. Circuit 25 monitors the contents of shift register 21 to detect the presence of a special control character E. Upon detecting an E character, circuit 25 signals control circuit 27. Another signal to control circuit 27 is provided by timer 26. It signals circuit 27 periodically at a predetermined frequency.

Control circuit 27 has three outputs 27a, 27b, and 27c. Clock signals are generated on output 27a to shift data through shift register 24. A pair of isochronous frame control signals S and E are respectively written into the beginning and end of shift register 24 by a control signal on output 27b. And multiplexer control signals are generated on output 27c and sent to multiplexer 22 to select one of the multiplexer inputs 22a and 22b.

In a quiescent state, controller 27 generates signals on its output 27c which pass data from input port 11 to output port 12 along path 20, 21, 22a, and 23. Subsequently, when timer 26 generates one of its periodic timing signals, circuit 27 generates the S and E characters respectively in the beginning and end of shift register 24. Thereafter, circuit 27 passes data from the input port to the output port along path 20, 21, 24, 22b, 22, and 23 until circuit 25 detects an E character in shift register 21. Then circuit 27 reverts back to its quiescent state. How this operation fits into the overall operation of network 10 will be explained in further detail in conjunction with FIG. 4.

Figure 3:
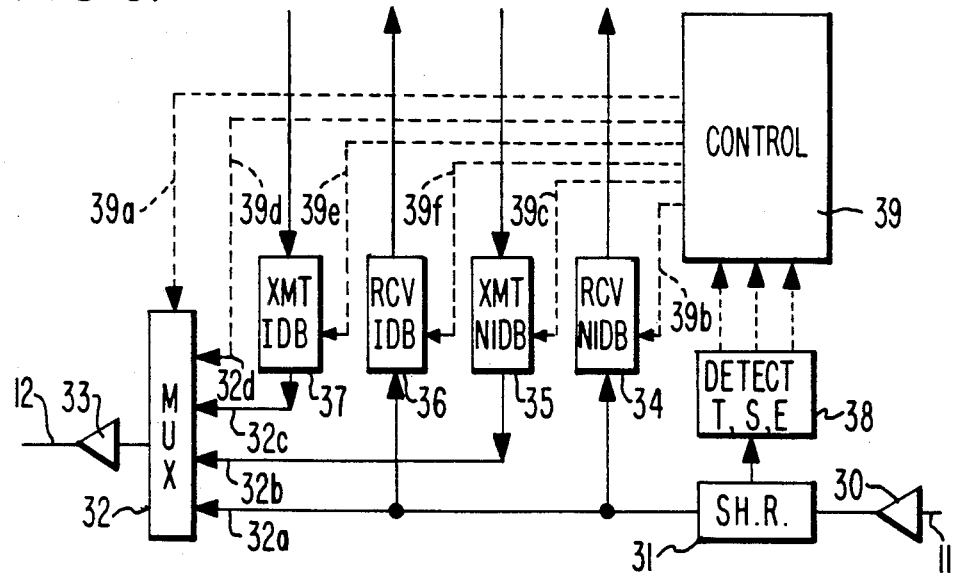
FIG. 3 shows the details of stations S1, S2, S3, S4, S5, and S6 in FIG. 1.

Consider now, however, the structure of stations S1, S2, S3, S4, S5, and S6 as illustrated in FIG. 3. Input port 11 of those stations is serially coupled to output port 12 through a receiver 30, a shift register 31, an input 32a of a multiplexer 32, and a transmitter 33. Thus data is passed from the input port to the output port with a delay which those components provide. In one specific embodiment, register 31 stores one character and thus imposes a delay of eight bit periods.

In addition, the FIG. 3 station includes four independent data buffers 34, 35, 36, and 37. Buffer 34 has an input that is coupled to the output of shift register 31 to receive nonisochronous data from the shift register. Buffer 35 contains nonisochronous data that is to be transmitted; and so it has an output that is coupled to an input 32b of multiplexer 32. Buffer 36 has an input that is coupled to the output of shift register 31 to receive isochronous data from the shift register. And buffer 37 contains isochronous data that is to be transmitted; and so it has an output that is coupled to an input 32c of multiplexer 32.

Further included in the FIG. 3 station is a detector circuit 38 which is coupled to shift register 31 for detecting three control characters T, S, and E. T represents a token; and S and E are the control characters that station RT generates in its shift register 24. S identifies the start of an isochronous frame, and E indicates its end.

A control circuit 39 is also included in the FIG. 3 station. It receives signals from the detector circuit 38 indicating the presence of a T, S, or E character in shift register 31; and in response thereto, it sends control signals on conductors 39a–39f to control the flow of data through the station. In a quiescent state, circuit 39 generates control signals on conductor 39a which direct multiplexer 32 to pass data from the input port to the output port through the multiplexer input 32a. As that data is passed through the station, circuit 39 may also generate control signals on conductor 39b to direct data buffer 34 to store a copy of the data as it passes through the station.

Subsequently, when circuit 38 detects the presence of a T in shift register 31, circuit 39 generates new control signals on conductors 39a and 39c. The signals on conductors 39c direct buffer 35 to send data to multiplexer input 32b, while the signals on conductor 39a pass multiplexer input 32b to the output port. After this writing operation is complete, control circuit 39 then generates a T followed by idle signals on conductors 39d, and it generates signals on conductor 39a which pass multiplexer input 32d to the output port.

At any time during the above-described passing of data from the input port to the output port or writing of nonisochronous data from data buffer 35, circuit 38 can detect an S character in shift register 31. If that occurs and the station has isochronous data in data buffer 37 to send, circuit 39 then generates control signals on conductors 39e which send data from buffer 37 to multiplexer input 32c, and it generates signals on conductor 39a which pass signals on multiplexer input 32c to the output port. At the same time, if the station has isochronous data to read, then circuit 39 generates control signals on conductor 39f which direct buffer 36 to store a copy of the signals from shift register 31. Subsequently, when circuit 38 detects the E character in shift register 31, control circuit 39 generates control signals on its output conductors which resume the operation that was occurring prior to the detection of the S character.

Reference should now be made to FIG. 4 which illustrates how the above-described stations of FIGS. 2 and 3 operate in conjunction with one another in a network. FIG. 4 is in the form of a rectangular array in which the columns are labeled S1, S2, S3, RT, S4, S5, and S6 and the rows are labeled T1 through T23. Each entry in this array shows the data that is being transmitted from a station which is identified by the column at a time that is identified by the row. For example, station S2 at time t8 is transmitting a character D3 from its output port.

Also in FIG. 4, the presence of a small triangle in the bottom-right corner of an array entry indicates a station is internally generating data on its output port that was stored within the station, as opposed to merely passing data from its input port to its output port. For example, at time t6, station S2 is generating internally stored data on its output port; while at time t1, station S2 is passing data from its input port to its output port.

Further in FIG. 4, if an entry in column RT is underlined, the underlining indicates that data is being passed from the input port to the output port through shift register 24. Conversely, an entry in column RT which is not underlined indicates that the shift register 24 is being bypassed.

Consider now the state of the stations at time t1. That state indicates that station S1 has been transmitting internally generated data from its output port for the last hundred characters and the remaining stations have been passing those characters. Each of the shift registers 21 and 31 provide a one character delay, so stations S2, S3, RT, S4, S5, and S6 respectively pass characters 99, 98, 97, 96, 95, and 94 on their output ports when station S1 is generating character 100 on its output port.

At time t2, station S1 completes its transmissions of internally stored nonisochronous data by sending a data trailer DT. This may be several status characters and error code correction characters; but it is shown as only one character for simplicity. Then at time t3, station S1 regenerates the token T. Thereafter, station S1 generates idle characters on its output port until it receives its own data trailer on its input port. Then station S2 passes data from its input port to its output port.

Station S2 continues to pass data from station S1 until it receives the token T. When that occurs, station S2 begins its own transmission. Those transmissions begin in FIG. 4 at time t4. First, switch S2 sends an idle character I; then it sends a data header character DH; and then it sends data characters 1, 2, 3, etc. Here again the data header may be several characters that identify the sending station, the station that is to receive the data, etc.

All of the characters that are received by station RT are sent through that station such that shift register 24 is bypassed until station RT receives one of the periodic timing signals from its timer 26. In FIG. 4, one of those timing signals is indicated as occurring at time t10.

At time t10, controller 27 generates signals on conductor 27b to form the S and E control characters at the beginning of shift register 24; it sends clocking signals on conductor 27a to cause data to move through shift register 24; and it sends signals on conductor 27c to pass multiplexer input 22b to output port 12.

Thus, at time t10, an S control character is sent from shift register 24 to output port 12, while data character 3 is sent from input port 11 to shift register 24. Similarly, at time t11, an isochronous data frame character I1 which was stored in shift register 24 between the S and E control characters is sent from shift register 24 to output port 12; while at the same time, data character 4 is sent from input port 11 to shift register 24. In like fashion, characters I2, E, 3, 4, etc., are sent through shift register 24 to output port 12 at time t12, t13, t14, t15, etc.

Consider now what happens when the isochronous frame S, I1, I2, E passes through station S4. Prior thereto, station S4 passes data from its input port to its output port through components 30, 31, 32a, 32, and 33. However, when the S control character enters shift register 31, circuit 38 detects the S and signals control circuit 39 of its presence. Then, if station S4 has isochronous data (e.g., voice) to send, it inserts an 8-bit sample in one of the isochronous character slots between the S and E control characters. As an example, FIG. 4 shows that station S4 inserts an isochronous data character I2' over the previous character I2 at time t13. Also, if station S4 is receiving isochronous data from another station on the network, then it copies the data in one of the isochronous character slots between the S and E character into the data buffer 36. For example, station S4 may copy the I1 character at time t12.

Station S5 behaves in a similar fashion when it detects the S control character in its shift register 31. As an example, FIG. 4 shows that station S5 writes a new isochronous data character I1' over the previous character I1 at time t13. Station S5 may also store a copy of the other isochronous data character I2' in its data buffer 36 at time t14.

Suitably, the determination of which slot a particular station can write into and which slot a particular station can read from is made by designating one of the stations as a master; and by sending requests to the master prior to writing or receiving data in the isochronous frame. This master then does the slot-allocating book-keeping and sends messages back to a requesting station telling it which slots in the isochronous frame to use.

Next, consider what happens after the isochronous frame passes around the communication network 10 and into the station which is presently transmitting nonisochronous data. In FIG. 4, that event is shown as occurring at time t15. Prior to time t15, the transmitting station S2 is receiving its own data on its input port. That data enters shift register 31 but does not pass through multiplexer 32. Thus the nonisochronous data is removed from network 10.

When the transmitting station S2 receives an S control character in a shift register 31, it immediately stops transmitting data from its buffer 35 and instead passes data from shift register 31 to the output port. Here again, as the isochronous data frame is passing through station S2, it may also read (write) an isochronous character from (to) the isochronous frame. Thereafter, when station S2 detects an E control character in its shift register 31, it resumes transmitting characters from its data buffer 35 and resumes removing data from the network that it receives on its input port. This is shown as occurring at time t19, t20, t21, . . . , etc.

Subsequently, the isochronous frame will pass all the way around network 10 and back into station RT. Then, after the E character has passed through shift register 21 and into shift register 24, station RT stops clocking shift register 24 and resumes passing data from its input port to its output port along the path 20, 21, 22a, 22, and 23. In FIG. 4 this is shown as occurring at time t21, t22, . . . , etc.

Various changes and modifications may also be made to the above details without departing from the nature and spirit of the invention. For example, any number of stations can be included in network 10. Also, any number of isochronous data slots can exist between control characters S and E of the isochronous frame. Further, any particular bit configuration, including code violations, may be used to signify the control characters T, S, and E. For example, a "1" bit and a "0" bit can be signified by one signal transition respectively in the first half and second half of a bit period, and selected bits of the control characters can have zero signal transitions per bit period. In addition, any type of logic circuitry, such as T²L or MOS circuitry may be used to implement the stations of FIGS. 2 and 3. For example, all of the components can be implemented according to the following table.

| TI 7440 | 20,30 | TI 74140 | 23,33 |
|---|---|---|---|
| TI 74164 | 21,24,31 | Synertek SY2167 | 34,35,36,37 |
| Signetics 82S100 | 25,38 | Motorola K1115A & | 26 |

| TI 74S151 | TI 74S169 22,32 | Intel 8086 | 27,39 |

Accordingly, it is to be understood that the invention is not limited to the above details but is defined by the appended claims.

What is claimed is:

1. A method of transmitting both isochronous and nonisochronous data through the stations of a computer network in which a plurality of stations have respective input and output ports that are serially coupled together to form a loop; said method including the steps of:
   transmitting data characters of a nonisochronous frame from a first station in said loop;
   passing the data characters from said first station through a second station in said loop and inserting a pair of spaced apart control characters between any two data characters during the passing step indicating the beginning and end of an isochronous frame within said nonisochronous frame;
   passing the data characters and control characters from said second station through a third station on said loop and writing an isochronous character generated from said third station into the space between said control characters;
   temporarily stopping said transmitting step in said first station in response to the receipt of one of said control characters to pass the isochronous frame through said first station; and
   proceeding, in said first station, with said transmitting of said nonisochronous frame after passing said isochronous frame.

2. A method of transmitting both isochronous and nonisochronous data in a computer network in which a plurality of stations have respective input and output ports that are serially coupled together to form a loop; said method including the steps of:
   passing with a first delay, data characters of a nonisochronous frame, from the input port to the output port of one station on said network;
   interrupting said passing step to generate a pair of spaced apart control signals on the output port of said one station respectively indicating the beginning and end of an isochronous data frame;
   passing with a second delay, from the input port to the output port of said one station, any data characters of said nonisochronous frame that are received on the input port starting with the generation of said isochronous frame; said second delay equaling at least said first delay plus the time duration on said output port of said isochronous frame;
   stopping said isochronous frame from passing through the output port of said one station after it has circulated around said loop at least once and into the input port of said one station; and
   continuing to pass data characters of said nonisochronous frame with said first delay through said one station after stopping said isochronous frame from passing through the output port of said one station.

3. A method according to claim 2 and further including the step of repeatedly performing said interrupting step at a predetermined rate.

4. A method according to claim 2 and further including the steps of:
   storing said isochronous frame in said one station after it has circulated once around said loop and into the input port of said one station; and
   sending the stored isochronous frame from the output port of said one station during a subsequent interrupt.

5. A method according to claim 2 and further including the steps of:
   switching, at the start of said interrupting step, a storage circuit that stores said isochronous frame and provides said second delay into a path that transfers data between said input and output ports of said one station; and
   switching said storage circuit out of said path that transfers data after said isochronous frame has circulated around said loop and back into said storage circuit.

6. A method of transmitting isochronous and nonisochronous data through a station in a computer network in which a plurality of stations have respective input and output ports that are serially coupled together to form a loop; said method including the steps of:
   receiving a token on the input port of one station;
   transmitting data characters of a nonisochronous frame from the output port of said one station in response to the receipt of said token;
   receiving a pair of control signals on the input port of said one station during said transmitting step indicating the beginning and end of an isochronous data frame;
   temporarily stopping said transmitting step in said one station in response to the receipt of said control signals and passing said isochronous frame through said one station to the output port; and
   continuing to transmit data characters of said nonisochronous frame from the output port of said one station after passing said isochronous frame through said one station.

7. A method according to claim 6 and further including the step of writing an isochronous data character between said pair of control characters during said stopping step.

8. A method according to claim 6 and further including the step of reading an isochronous data character from between said pair of control characters during said stopping step.

9. A method of transmitting isochronous and nonisochronous data in a computer network in which a plurality of stations have respective input and output ports that are serially coupled together to form a loop; said method including the steps of:
   passing data characters of a nonisochronous frame through one station from its input port to its output port;
   interrupting said passing step in response to the receipt of a pair of control signals on the input port of said one station that occur between any two data characters in said nonisochronous frame, said control signals indicating the beginning and end of an isochronous frame inserted within said nonisochronous frame and having a higher priority than said isochronous frame;
   sending, from said output port, said control signals plus information bits generated from said one station inserted between said control signals; and
   continuing to pass data characters of said nonisochronous frame upon the completion of said sending step.

10. A method according to claim 9 and further including the step of reading a data character from between said pair of control signals during said interrupting step.

11. A method according to claim 9 and further including the step of storing a copy in said one station of the characters of said nonisochronous frame as they pass through said one station.

* * * * *